United States Patent
Stewart

(10) Patent No.: US 8,067,849 B2
(45) Date of Patent: Nov. 29, 2011

(54) WAVE ENERGY CONVERTER WITH INTERNAL MASS ON SPRING OSCILLATOR

(75) Inventor: David B. Stewart, Cranbury, NJ (US)

(73) Assignee: Ocean Power Technologies, Inc., Pennington, NJ (US)

(*) Notice: Subject to any disclaimer, the term of this patent is extended or adjusted under 35 U.S.C. 154(b) by 594 days.

(21) Appl. No.: 12/290,026

(22) Filed: Oct. 24, 2008

(65) Prior Publication Data

US 2009/0085357 A1    Apr. 2, 2009

Related U.S. Application Data

(63) Continuation-in-part of application No. 11/607,386, filed on Dec. 1, 2006, now Pat. No. 7,443,046.

(60) Provisional application No. 60/741,108, filed on Dec. 1, 2005.

(51) Int. Cl.
F03B 13/00    (2006.01)

(52) U.S. Cl. .......................................................... 290/53

(58) Field of Classification Search ................... 290/53; 60/495
See application file for complete search history.

(56) References Cited

U.S. PATENT DOCUMENTS

| | | | | |
|---|---|---|---|---|
| 3,696,251 A | * | 10/1972 | Last et al. | 290/53 |
| 7,140,180 B2 | * | 11/2006 | Gerber et al. | 60/496 |
| 7,148,583 B1 | * | 12/2006 | Shau et al. | 290/1 R |
| 7,199,481 B2 | * | 4/2007 | Hirsch | 290/42 |
| 7,305,823 B2 | * | 12/2007 | Stewart et al. | 60/495 |
| 7,476,137 B2 | * | 1/2009 | Stewart et al. | 441/1 |
| 7,538,445 B2 | * | 5/2009 | Kornbluh et al. | 290/53 |
| 7,688,036 B2 | * | 3/2010 | Yarger et al. | 320/137 |
| 2006/0090463 A1 | * | 5/2006 | Burns et al. | 60/495 |
| 2007/0261404 A1 | * | 11/2007 | Stewart et al. | 60/495 |
| 2009/0278358 A1 | * | 11/2009 | Lemieux | 290/53 |

FOREIGN PATENT DOCUMENTS

| | | | | |
|---|---|---|---|---|
| EP | 1691072 A1 | * | 8/2006 | |
| GB | 2169684 A | * | 7/1986 | |
| WO | WO 2010047677 A1 | * | 4/2010 | |

* cited by examiner

*Primary Examiner* — Joseph Waks
(74) *Attorney, Agent, or Firm* — Henry I. Schanzer, Esq.

(57) ABSTRACT

A wave energy converter (WEC) system includes a shell containing an internal oscillator comprised of a reaction mass suspended from the shell by an elastic spring in parallel with a constant force spring. The constant force spring provides a relatively constant force (Fc) to counterbalance the static weight of the reaction mass and reduce the extension "static" length of the elastic spring while the elastic spring exerts a force ($F_{es}$) on the reaction mass that is proportional to the displacement, x, of the elastic spring. A power take-off (PTO) device, located within the shell, coupled between the shell and the internal oscillator converts their relative motion into electrical energy.

13 Claims, 7 Drawing Sheets

WAVE ENERGY CONVERTER WITH INTERNAL MASS ON SPRING OSCILLATOR

This application is a continuation-in-part of application Ser. No. 11/607,386 for WAVE ENERGY CONVERTER UTILIZING INTERNAL REACTION MASS AND SPRING filed Dec. 1, 2006 now U.S. Pat. No. 7,443,046 whose teachings are incorporated by reference as though fully forth herein, and which claims the benefit of Provisional Application No. 60/741,108 filed Dec. 1, 2005.

BACKGROUND OF THE INVENTION

This invention relates to apparatus for converting energy present in surface waves of large bodies of water into useful electrical energy.

Various wave energy converter (WEC) systems are known. For example, reference is made to U.S. patent application Ser. No. 09/379,421 filed Aug. 21, 1999, titled "Wave Energy Converter Utilizing Pressure Difference", assigned to the assignee of the present application and the teachings of which are incorporated herein by reference.

Known WEC systems generally include a "float" (or "shell") and a "spar" (or "shaft" or "column" or "piston") which are designed to move relative to each other to convert the force of the waves into mechanical energy. In these systems, the float is generally depicted or referred to as the moving member and the spar as the non-moving or mechanically grounded member. But, the opposite may be the case. Alternatively, the spar and float may both move relative to each other.

In these prior art WEC systems, the float and spar are exposed to the water elements and forces. As shown in FIG. 1, a WEC generally includes a power-take-off device (PTO) coupled between the float (WEC shell) and the spar (shaft or column) to convert the mechanical power available from the WEC into electrical power. The PTO device may be any device capable of converting the relative motion between the float and spar into electrical energy. For example, the PTO device may be a linear-to-rotary translator (e.g. rack and pinion gear assembly, a ball screw assembly, a hydraulic cylinder and motor assembly, or a pneumatic cylinder and motor assembly) coupled to a rotary electric generator. The PTO device can also be a linear electric generator (LEG) that directly converts mechanical power to electric power using electromagnetic induction.

In some WEC systems the PTO device is placed in the water and is coupled to the float and spar. In other systems, a mechanical linkage (e.g. "pushrod") connected to one of the float and spar is attached to a PTO device located inside the other of the float and spar, with the pushrod passing through an air-tight seal.

Numerous problems exist in the design of such systems for harnessing the energy contained in water surface waves. Some of these problems include:

- The bearings between the float and spar are complex and expensive because of the need to operate in water and to be subjected to marine growth, contamination and corrosion.
- The power take-off device and its bearings are complex and expensive because of the need to operate in water and be subjected to marine growth, contamination and corrosion.
- The mechanical linkage connecting a float to an internally mounted PTO is subject to marine growth, corrosion and contamination.
- Wave forces and viscous damping limit the extent to which the float and spar can move relative to each other, thereby decreasing the potential for energy collection.
- The efficiency of a "point absorber" type WEC is often limited by the viscous damping of the water.
- The design of a mooring (anchoring) system for a WEC consisting of two or more objects that interact directly with the water and waves is often complex.

Some of the problems noted above have been recognized and addressed in the prior art, as discussed, for example, in: (1) Temeev, A., Antufyev, B., and Temeev, S.; "Simulation of Oscillatory Drive for Float Wave Energy Converter", in Fifth European Wave Energy Conference Proceedings, Hydraulics & Maritime Research Centre, Cork, Ireland, pp. 386-391, 2003; and (2) French, M. J. and Bracewell, R. H., "*Heaving Point-Absorbers Reacting Against an Internal Mass*", in Hydrodynamics of Ocean Wave-Energy Utilisation, Lisbon, Portugal, Springer-Verlag, pp 247-55, 1985. As suggested in these references some of the problems, discussed above, may be overcome by constructing a WEC with a "float" that is acted upon by the waves, a "reaction" mass that is totally contained within the float, and a spring and power take-off device that couple the reaction mass to the float. In this type of system, the enclosed mass (m) is suspended from, or supported by, a spring that is connected to the float and whose force constant (k) is tuned to give the desired natural period $(T_n)$ of the WEC.

A problem with this approach (i.e., selecting the spring force characteristic to yield a desired natural period) is that the length of the spring is typically very large, and it is not practical to construct or house such a large spring within the float. The length of the spring in still water $(x_0)$ can be determined by solving the two following equations simultaneously.

$$m \cdot g = k \cdot x \qquad \text{Equation 1}$$

$$\sqrt{\frac{k}{m}} = f_n = \frac{2\pi}{T_n} \qquad \text{Equation 2}$$

Equation 1 shows that the downward force of the reaction mass (m·g) is equal to the upward force of the spring (k·x) in static conditions. Equation 2 shows that the mass (m) and spring force constant (k) can be selected to give the mass-spring oscillator a natural oscillating frequency near that of the predominant waves; where $T_n$ is equal to the period of the wave.

If the two equations are solved simultaneously, the still-water extension spring length $(x_0)$ would be:

$$x_0 = \left(\frac{T_n}{2\pi}\right)^2 \cdot g \qquad \text{Equation 3}$$

If the mass-spring system is tuned for a 4-second wave (T), the length of the spring $(x_0)$ would be approximately 4 meters. If the mass-spring system is tuned for an 8-second wave (T), the length of the spring $(x_0)$ would be approximately 16 meters. Fabricating and locating such a large spring within a float presents many problems.

The problem with the need for a very long spring, described above, is overcome in systems embodying the invention as described below.

SUMMARY OF THE INVENTION

This invention relates to a wave energy converter (WEC) that includes a "float" which is exposed to the surface waves, an internal "oscillator" formed by a mass and a novel spring system, and a power take-off device which is coupled between the mass and the float.

A WEC system embodying the invention includes a "shell" ("float" or "hull") containing an internal oscillator including a "reaction mass" and a spring system which includes an elastic spring (ES) and constant force spring (CFS). A power take-off (PTO) device is coupled between the shell and the internal oscillator to convert their relative motion into electric energy. The shell and internal oscillator are constructed such that, when placed in a body of water and in response to waves in the body of water, there is relative motion between the shell and the internal oscillator's mass, i.e., what is termed the reaction mass.

In one embodiment, the spring system or mechanism includes a constant force spring connected between the oscillator's reaction mass and the shell and an elastic spring also connected between the reaction mass and the shell. The constant force spring provides a force (Fc) which is nearly constant to counterbalance the static weight of the reaction mass. The constant force spring can be any device which exerts a constant force over its range of motion. It does not obey Hooke's law. The elastic spring exerts a force ($F_{es}$) on the reaction mass that is proportional to the displacement, x, according to Hooke's law; i.e., $F_{es}=k_e x$, where $k_e$ is essentially constant.

An advantage of the invention is that the constant force spring may be used to control and reduce the extended "static" length of the elastic spring without reducing the ability of the elastic spring to provide a desired dynamic range of motion.

The elastic spring can be a physical spring, such as a coil spring, a leaf spring or a torsional spring. Alternatively, the function of the elastic spring mechanism may be obtained by controlling the PTO so it behaves like a spring (i.e. back-force increases with displacement); or by a combination thereof.

The PTO device can be any one of a number of devices, including a linear electric generator (LEG), or a translator that converts linear motion and force to rotary motion and torque, coupled to an electric generator (e.g., a rotary generator).

In systems embodying the invention, the WEC may have a "positive" system buoyancy such that it floats on the surface of the water and responds to changes in buoyant force due to passing waves, or the WEC may have a "neutral" system buoyancy such that it remains disposed within the volume of the body of water and responds to changes in hydrodynamic pressure due to passing waves.

In order to keep the pre-deployed or "dry" mass of the WEC to a minimum, the reaction mass can be a water tank that is filled only after the WEC is deployed in the water. It should be appreciated that WEC buoy batteries (functioning to store the converted energy) can also be used as the reaction mass.

BRIEF DESCRIPTION OF THE DRAWINGS

In the accompanying drawings, which are not drawn to scale, like reference characters denote like components.

DETAILED DESCRIPTION OF THE INVENTION

Figure 1:
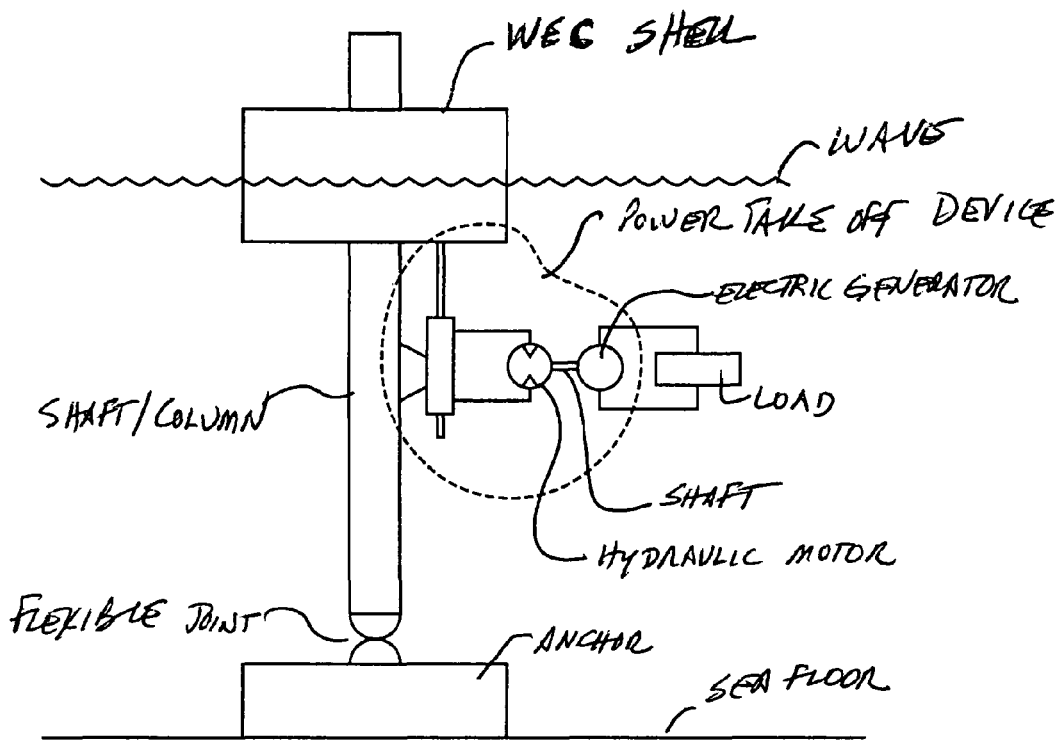
FIG. 1 shows a generalized version of a prior art wave energy converter (WEC)

As discussed above with reference to FIGS. 1 and 2 and as noted in references (1) and (2), cited above, it has been suggested to overcome problems with existing WECs in which the spar, float and PTO device are exposed to the water by constructing a WEC with a "shell" (float) that is acted upon by the waves and using a "reaction" mass that is totally contained within the float with a spring and power take-off device that couple the reaction mass to the float. In this type of system, the enclosed mass (m) is suspended from, or supported by, a spring that is connected to the float and whose force constant (k) is tuned to give the desired natural period ($T_n$) of the WEC. A problem with this approach (i.e., selecting the spring force characteristic to yield a desired natural period) is that the required length of the spring is so long (large) that it is not practical to construct it or house it within the float. The extension length of the spring in still water ($x_0$) can be determined by solving the two following equations simultaneously.

$$m \cdot g = k \cdot x \qquad \text{Equation 1}$$

$$\sqrt{\frac{k}{m}} = f_n = \frac{2\pi}{T_n} \qquad \text{Equation 2}$$

Equation 1 indicates that the downward force of the reaction mass (m·g) is equal to the upward force of the spring (k·x) in static conditions. Equation 2 indicates that the mass (m) and spring force constant (k) can be selected to give the mass-spring oscillator a natural oscillating frequency near that of the predominant waves.

If the two equations are solved simultaneously, the still-water extension spring length ($x_0$) of an elastic spring would be:

$$x_0 = \left(\frac{T_n}{2\pi}\right)^2 \cdot g \qquad \text{Equation 3}$$

If the mass-spring system is tuned for a 4-second wave (T), the extension length of the spring ($x_0$) would be approximately 4 meters. If the mass-spring system is tuned for an 8-second wave (T), the length of the spring ($x_0$) would be approximately 16 meters.

Figure 2:
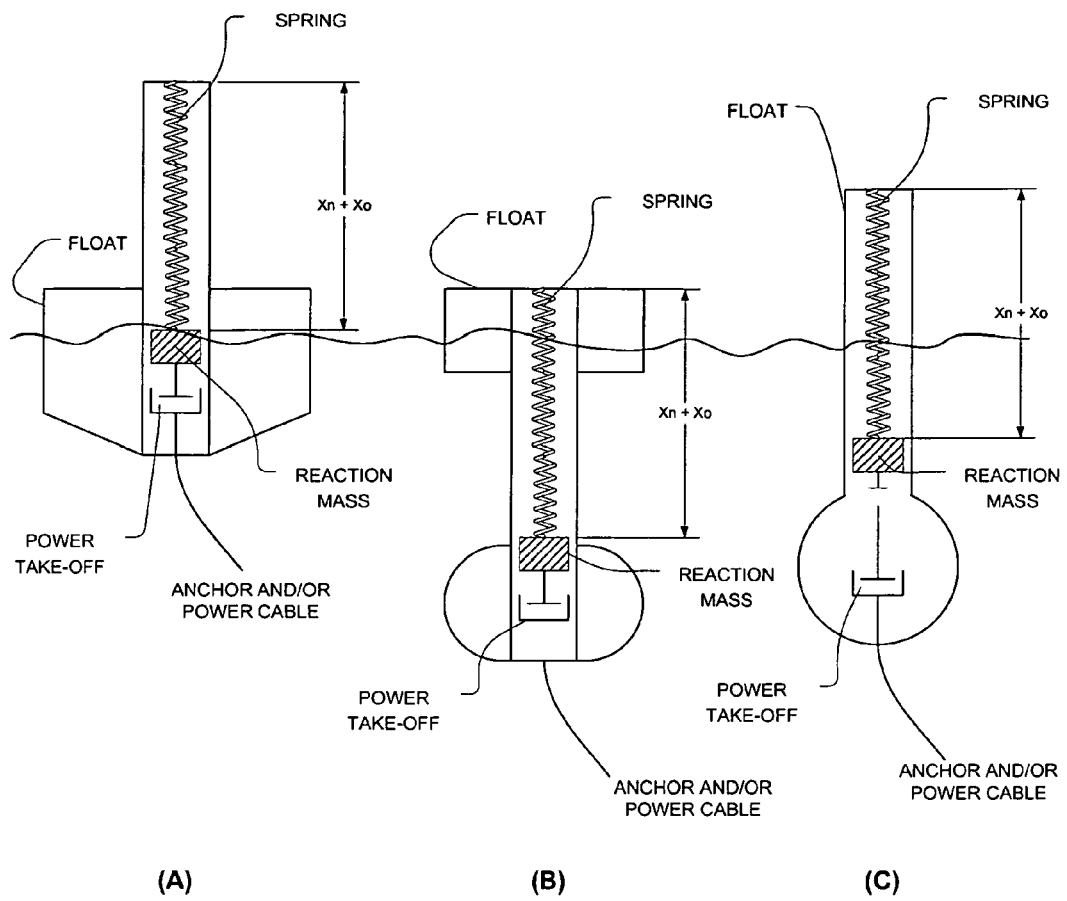
FIG. 2 shows several configurations of prior art WECs which include a float, a reaction mass, a PTO and a very long spring.

In FIG. 2, drawings (A), (B) and (C) show different WEC configurations, each illustrating a WEC with a spring that is tuned to provide an oscillatory period of about 8 seconds. In each instance, the extension spring length under static conditions is quite long (e.g., 16 meters for an 8 second wave). The extension spring length must be capable of being stretched further to provide a desired dynamic range. This requires that the shell ("envelope") of the WEC be made large to accommodate the extension and stroke of the spring.

The problems associated with the need to tune the mass-spring oscillator for long wave periods and the resulting need for long and/or large springs and associated envelopes are substantially reduced, if not totally overcome, in systems embodying the invention.

Figure 3:
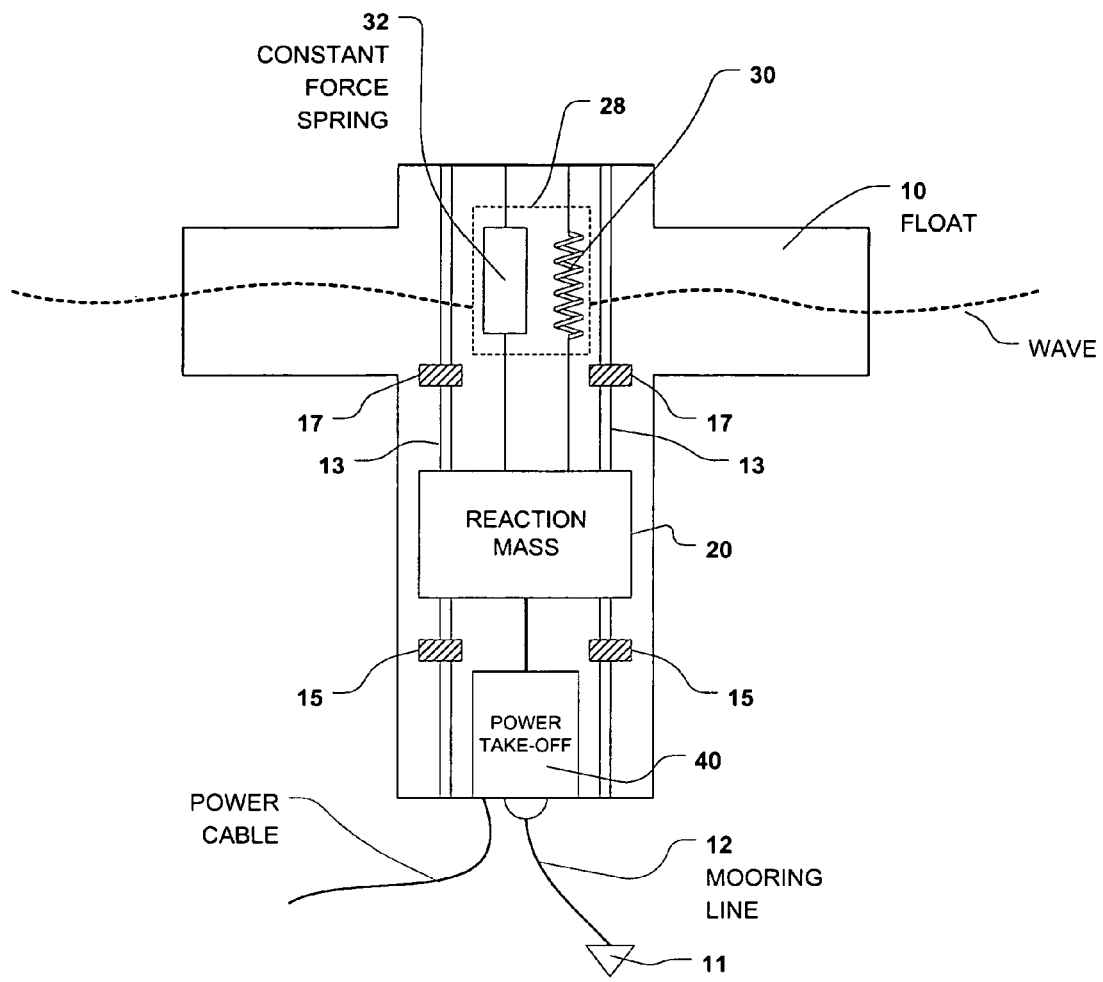
FIG. 3 depicts a WEC embodying the invention in which an elastic spring and a constant force spring are used to attach a reaction mass to a shell.

As shown in FIG. 3, a WEC embodying the invention includes: (a) a "float" ("shell" or "hull") 10 which is exposed to the surface waves; (b) an internal "oscillator" formed by a reaction mass 20 and the parallel combination 28 of an elastic spring 30 and a constant force spring 32; and (c) a power take-off device (PTO) 40 coupled between the mass 20 and float 10 to convert mechanical energy into electric energy. In FIG. 3, the elastic spring 30 has two ends, one end is connected to the shell ("float") and the other end is connected to the reaction mass 20. Likewise, the constant force spring 32 has two ends, one end being connected to the shell and the other end being connected to the reaction mass. Thus, in FIG. 3, the reaction mass 20 is shown suspended from the other (bottom) ends of the constant force and elastic springs.

As noted above, the constant force spring 32 can be any device which exerts a constant force over its range of motion. That is, the connecting arm/wire of CFS 32 to the reaction mass can, and does, move up and down as the elastic spring 30 moves up and down, but CFS 32 only exerts a constant force Kc, at all times.

The shell and internal oscillator are constructed such that, when placed in a body of water and in response to waves in the body of water, there is relative motion between the shell 10 and the internal oscillator's mass 20. For example, the shell moves up and down in response to the up and down motion of the waves. Then, after a phase delay the mass 20 moves, correspondingly. The relative motion of the float and mass/spring is converted by the PTO 40 into electrical energy. The PTO device 40 can be any one of a number of suitable devices, including a linear electric generator (LEG), or a translator that converts linear motion and force to rotary motion and torque, coupled to a rotary electric generator.

The elastic spring 30 which connects the reaction mass 20 to the shell 10 can be a physical spring, such as a coil spring, a leaf spring or a torsional spring. Alternatively, the function of spring 30 may be obtained by; (a) controlling the PTO so it behaves like a spring (i.e. back-force increases with displacement); and/or (b) by a combination of a physical and an equivalent device. Actually, elastic spring 30 can be any spring or corresponding mechanism which functions in accordance with Hooke's law. That is, it exhibits a force $F_{es}=k_e \cdot x$, where $k_e$ is the spring force constant and "x" is the distance the spring is extended (or contracted).

An important aspect of the present invention is the recognition that the static extension length of a conventional elastic spring can be reduced by using a constant force spring 32 in parallel with the elastic spring 30. As shown in FIG. 3, the constant force spring 32 is connected between the reaction mass 20 and the shell 10. The constant force (Fc=Kc) of CFS 32 is selected to counter balance the weight [(m)(g)] of the reaction mass. The force Fc of the constant force spring 32 can be selected to be equal to [(m)(g)] so that Xo of the elastic spring 30 is zero. Alternatively, for systems considerations, Fc can be selected to have any value equal to [z][(m)(g)]; where z is a fractional number between zero (0) and one (1).

Figure 4A:
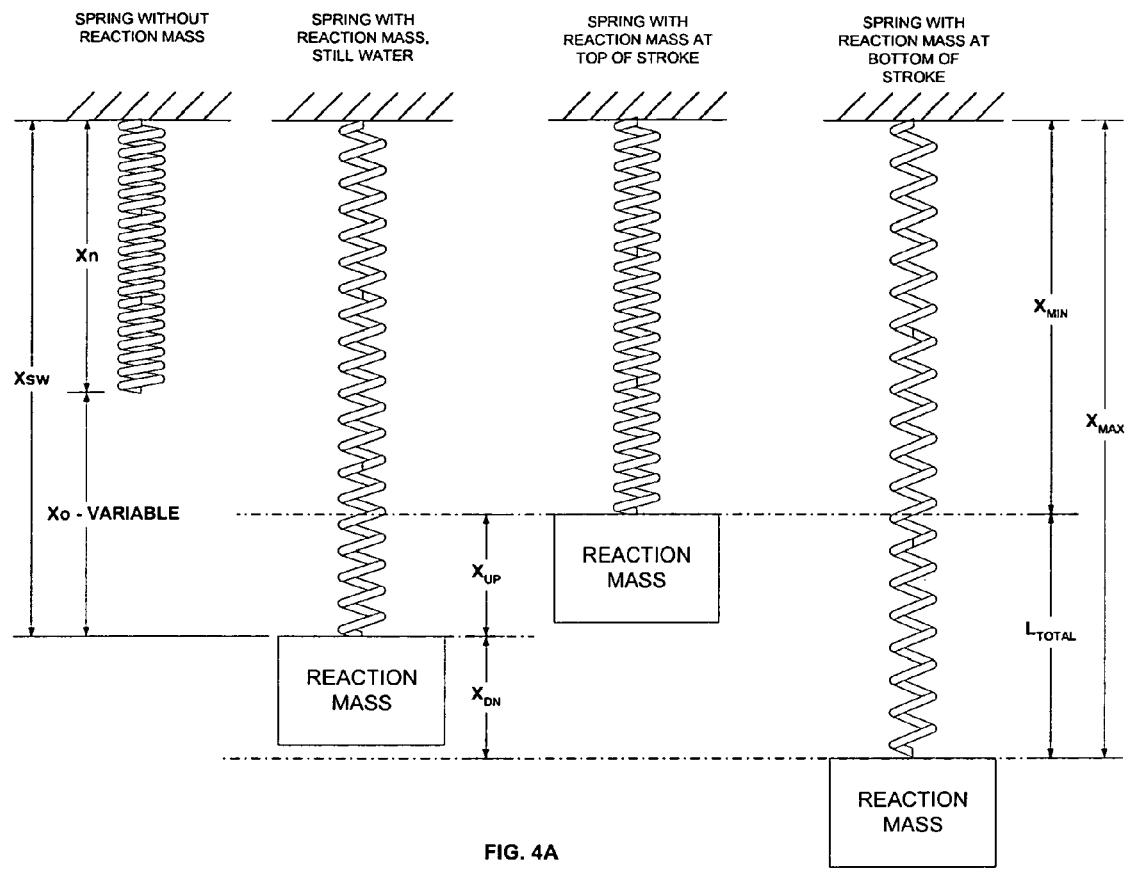
FIG. 4A is a simplified diagram of the operation of an elastic spring as per the prior art.

In the absence of the constant force spring 32, the elastic spring 30 would need to be extended as shown in FIG. 4A.

That is, the spring 30 initially has a length Xn, (which may range from part of a meter to several meters) when attached at its upper end to the shell with no load attached to its other end. Then, when a reaction mass 20 is attached to its other end, with the spring-mass oscillator being tuned for optimum wave energy capture, the spring 30, under static conditions would be extended a length Xo, whereby the total static length of the spring 30 in still water would be Xn+Xo, when measuring from a reference point such as the top of the shell or float. In response to the forces of the waves applied to a WEC containing the spring-mass oscillator, the reaction mass moves up and down about a horizontal steady state base line extending a distance Xn+Xo from the reference point on the shell to which the spring is attached.

FIG. 4A and Table 1 may be used to illustrate the operation of the prior art system using a single elastic coil/spring. Table 1 is a tabulation of: (a) the "static" (still water) extension length $x_0$ of the elastic spring which would be required for a given ratio of k/m when connected to a selected reaction mass, in accordance with the prior art; (b) the extension length of the spring ($x_{max}$) when subjected to a further downward force; and (c) the extension length of the spring ($x_{min}$) when subjected to an upward (compressive) force. Thus, Table 1 tabulates the various extension lengths of an elastic spring for a conventional coil spring configuration; where ($x_0$) is the coil spring displacement/extension in still water when the spring constant, $k_{es}$, is tuned for different predominant wave periods, $T_n(s)$; ($x_{min}$) is the minimum extension length, and ($x_{max}$) is the maximum extension length for a reaction mass with stroke (L) as a function of oscillator period ($T_n$). Note that, as shown in FIG. 4A, the spring has a "normal" (unloaded) length of Xn when there is no reaction mass attached to the spring. When the reaction mass is attached to the spring the spring is subjected to an additional static (still water) extension amount of length Xo. The extension length Xo varies to take into account the values of the elastic spring constant $k_{es}$ to tune the spring-reaction mass oscillator for the predominant wave period. By way of example, to tune the reaction mass and spring for an 8 second wave, the needed reaction mass when attached to the spring would cause the spring to be extended by an amount Xo, approximately equal to 16 meters, This would define the total length (XT=Xo+Xn) of the elastic spring in "still water". Oscillations induced by the effects of the waves will cause the reaction mass to be moved dynamically: (a) by an amount Xup above XT (or Xo) in a direction to cause compression of the spring; and (b) by an amount Xdn below XT (or Xo) in a direction to cause further stretching of the spring. The movement of the spring between Xmin and Xmax defines the dynamic range or stroke (L) of the spring. In Table 1 it is assumed that the swing up is symmetrical to the swing down, in response to the forces of the waves on the shell.

TABLE 1

| $T_n(s)$ | Xsw = Xn + $X_0$ (m) | $X_{min}$ (m)  Xo − ½ L | $X_{max}$ (m)  Xo + ½ L |
| --- | --- | --- | --- |
| 1 | Xn + 0.25 | Xn + 0.25 − 0.5 L | Xn + 0.25 + 0.5 L |
| 1.5 | Xn + 0.56 | Xn + 0.56 − 0.5 L | Xn + 0.56 + 0.5 L |
| 2 | Xn + 0.99 | Xn + 0.99 − 0.5 L | Xn + 0.99 + 0.5 L |
| 3 | Xn + 2.23 | Xn + 2.23 − 0.5 L | Xn + 2.23 + 0.5 L |
| 4 | Xn + 3.97 | Xn + 3.97 − 0.5 L | Xn + 3.97 + 0.5 L |
| 8 | Xn + 15.89 | Xn + 15.89 − 0.5 L | Xn + 15.89 + 0.5 L |

The constant force spring 32 can be used to eliminate (partially or totally) the "static" extension length Xo of an elastic spring due to the weight of the reaction mass 20. The extension length Xo of the elastic spring 30 can then be selectively reduced or eliminated since the elastic spring can now be designed for a spring displacement (travel) to handle the dynamic change (stroke, L) due to the oscillations of the reaction mass (but not its static weight value).

It is evident that it is easier to fit a short spring inside a WEC buoy. This has significant advantages in the design and hydrodynamic performance of WECs embodying the invention. Even if it is possible to construct a long spring with the proper force-displacement characteristic, the volume of the WEC buoy occupied by the spring and reaction mass, as per the prior art, causes the WEC buoy to be long and its hydrodynamic performance to be adversely impacted.

In the WEC embodying the invention shown in FIG. 3, the float (10), loosely anchored to the sea floor (11) via a mooring line 12, is allowed to move up and down with the waves. The "reaction" mass (20) is contained inside the shell (10) and its vertical motion is guided by a set of low-friction rails or guides (13). The total vertical motion of the reaction mass is limited by a set of end-stops (lower stops 15 and upper stops 17) that can be sets of springs or dampers (15, 17) or a combination thereof. The reaction mass (20) is connected to the shell 10 via assembly 28 comprising elastic "oscillator" spring (30) and constant force spring 32.

Thus, FIG. 3 illustrates that, in accordance with the invention, the elastic a constant force spring 32 is placed in parallel with an elastic spring 30. The constant force spring, 32, sometimes called a "counterbalance spring," exerts a relatively constant force ($F_c$) on the reaction mass. For the constant force spring, $F_{cs}=K_c$, where $K_c$ is nearly constant. In contrast, the elastic spring 30 exerts a force ($F_{es}$) on the reaction mass that is proportional to the displacement, x, according to Hooke's law. For the elastic spring, $F_{es}=K_e$ x, where $K_e$ is essentially constant. In FIG. 3, the reaction mass (20) is guided vertically by guide rails (13) to keep the reaction mass (20) from spinning as it goes up and down. The reaction mass (20) is connected to constant force spring, 32, and to elastic spring (30), both of which are connected at their other ends to the shell. The reaction mass (20) is also connected to a power take-off device 40 that converts the relative motion and force between the shell and reaction mass into mechanical or electrical power. A ball screw coupled to a rotary electric generator is one such device. As the reaction mass (20) mass moves up and down, the translator rotates. An electric generator is connected to the translator. As the mass moves up and down, the translator rotates clockwise and counterclockwise, and electric power is generated.

The force constant, $K_c$, of CFS 32 is selected so that it is equal to, or approximately equal to, the gravitational force acting on the reaction mass. The gravitational force is equal to [(m)(g)]; where m is the mass of the reaction mass 20 and g is the gravitational acceleration constant. The elastic spring's force constant is selected so as to give the mass-on-spring oscillator WEC (MOSWEC) system a natural period near the predominant wave period (reference Equation 2).

The length of the spring in still water ($x_0$) is defined by the following equations.

$$m \cdot g = k_e x + k_c \quad \text{Equation 4}$$

$$\sqrt{\frac{k_e}{m}} = f_n = \frac{2\pi}{T_n} \quad \text{Equation 5}$$

Equation 4 indicates that the downward force of the reaction mass (m·g) is equal to the combined upward force of the counterbalance spring ($F_{cs}=K_c$) and the elastic spring ($F_{es}=k_e \cdot x$) in static conditions. If $K_c$ (the force, Fcs, of the constant force spring 32) is selected to be approximately equal to the weight of the Reaction Mass (m·g), then the spring extension/compression length in still water (Xo in FIG. 4B) would be approximately zero. In many instances the force $F_{cs}$ is made slightly less than (m·g) to keep the elastic spring under tension. In this latter case, the still water length (Xo) of the spring is longer than for the case where $K_c$=m*g and the elastic spring may then be maintained under tension to avoid placing the spring in a compression mode which might cause it to bulge.

But as before, equation 5 (or 2) indicates that the mass (m) and spring force constant ($K_e$) can be selected to give the mass-spring oscillator a natural oscillating frequency near that of the predominant waves.

Figure 4B:
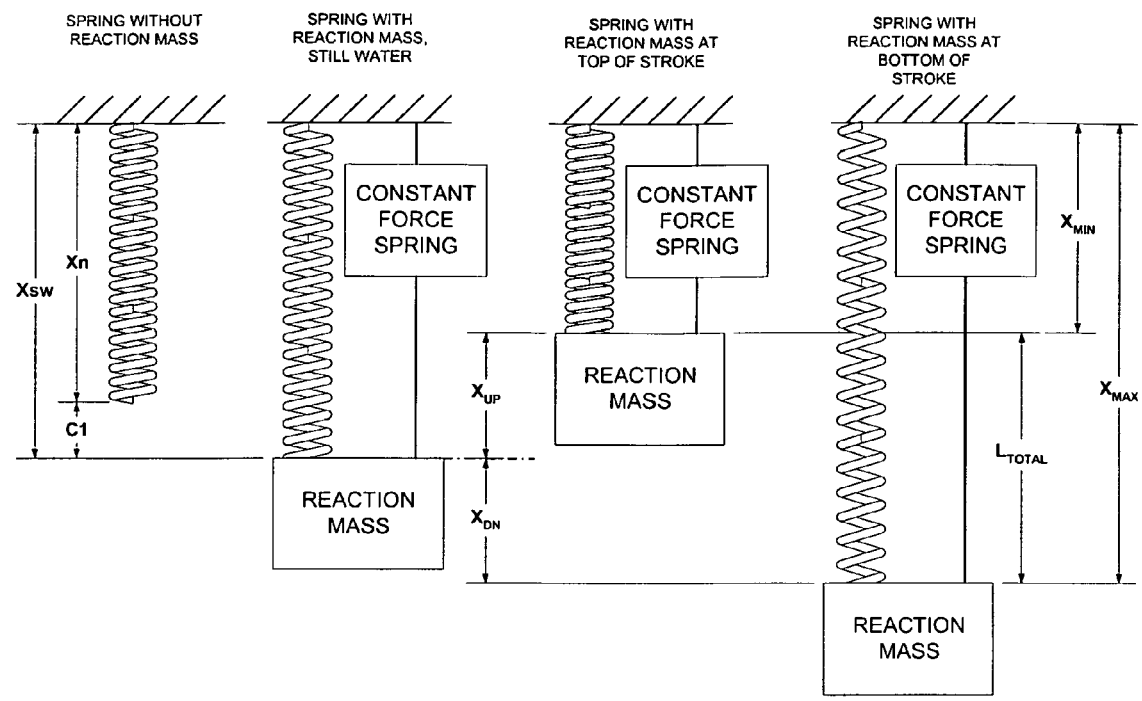
FIG. 4B is a simplified diagram representing the operation of a "compound" spring in accordance with the invention.

FIG. 4B and Table 2 may be used to illustrate the operation of the system of FIG. 3 which embodies the invention. Table 2 tabulates various lengths of an elastic spring 30 when used in parallel with a constant force spring configuration. Note, Xsw=Xn+C1 is the elastic spring displacement in still water; ($X_{min}$) is the elastic spring's minimum length, and ($X_{max}$) is the elastic spring's maximum length for a given reaction mass with a dynamic stroke (L) as a function of oscillator period ($T_n$) when the elastic spring constant $k_{es}$ is tuned for the predominant wave periods.

In accordance with the invention, the constant force spring 32 may be selected such that the extension of the elastic spring 30 in still water is equal to Xn+C1, where Xn is the normal extension of the unloaded elastic spring 30 and C1 is a constant value which may be selected to have a value between zero and the value of Xo obtained from Equation 3. The length, Xmax, of the elastic spring when fully extended (at the bottom of the stroke) may then be expressed as Xn+C1+L/2 and the length, Xmin, of the elastic spring when fully retracted (at the top of the stroke) may then be expressed as Xn+C1−; assuming equal up and down strokes.

TABLE 2

| $T_n$ (s) | Xsw = Xn + C1 (m) | $X_{min}$ (m) | $X_{max}$ (m) |
|---|---|---|---|
| 1 | Xn + C1 | Xn + C1 − 0.5 L | Xn + C1 + 0.5 L |
| 1.5 | Xn + C1 | Xn + C1 − 0.5 L | Xn + C1 + 0.5 L |
| 2 | Xn + C1 | Xn + C1 − 0.5 L | Xn + C1 + 0.5 L |
| 3 | Xn + C1 | Xn + C1 − 0.5 L | Xn + C1 + 0.5 L |
| 4 | Xn + C1 | Xn + C1 − 0.5 L | Xn + C1 + 0.5 L |
| 8 | Xn + C1 | Xn + C1 − 0.5 L | Xn + C1 + 0.5 L |

Thus, in accordance with the invention, as shown in FIG. 4B and as set forth in Table 2, a constant force spring 32 may be placed in parallel with an elastic spring 30 to control and/or adjust the length Xsw=Xn+C1 such that C1 is either: (a) equal to zero; or (b) equal to a selected value greater than zero, but normally less than the value required by the prior art. The CFS 32 can be selected such that, for an 8 second wave C1 of the elastic spring can be set to zero or to any length between zero and 16 meters, That is, a constant force spring 32 can be selected to control the "static" extended length Xsw of the elastic spring, in still water, when a reaction mass is attached to the constant force spring and the elastic spring. This enables the constant force spring 32 to provide an easy and effective means to control and set Xsw to any desired/suitable length. The dynamic range of the elastic spring has not been significantly altered such that the spring and reaction mass can still be moved up (compressed) by an amount Xup or stretched further down by an amount Xdn in a direction to cause further extension of the spring. As before, the movement of the spring between the top of Xup and the bottom of Xdn defines the dynamic range or stroke (L) of the spring. The dynamic range defines the power obtainable from the system. Thus, by introducing a constant force spring in parallel with the elastic spring a WEC of much smaller physical dimension can be manufactured which can still deliver the same amount of power. Another advantage of the system embodying the invention is that it removes certain constraints on the physical design of the WEC. This provides a significant advantage in the manufacture of the WEC.

Figure 5:
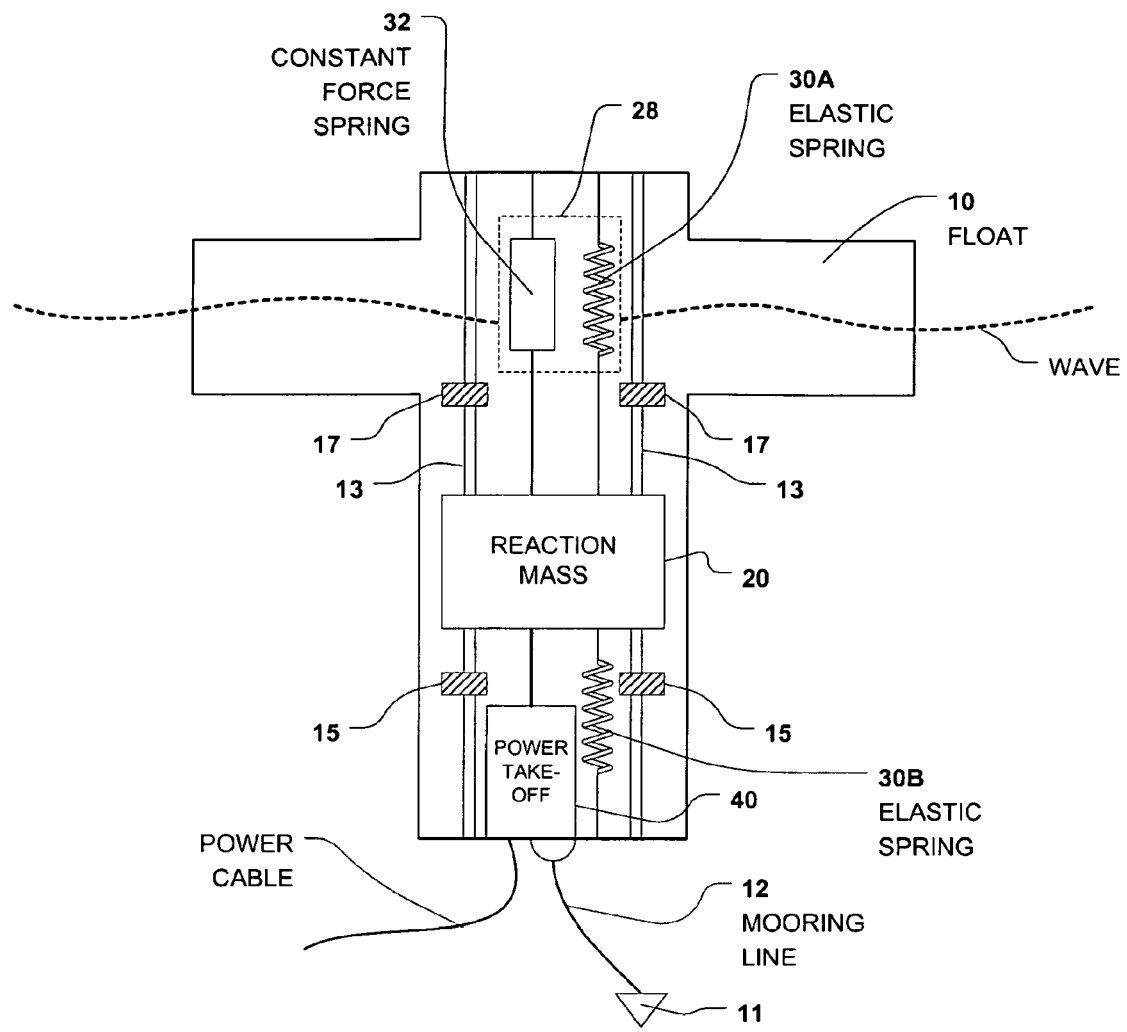
FIG. 5 is a simplified block diagram of a WEC in which a constant force spring and upper and lower elastic springs are used to control the positioning and movement of a reaction mass.

FIG. 5 shows that an elastic spring 30A may be connected between the reaction mass 20 and the top of the shell and an elastic spring 30b may be connected between the reaction mass 20 and the bottom of the shell. Note that a single CFS 32 is used and the PTO 40 is shown connected between the reaction mass and the bottom of shell 10. Except for the lower spring, FIG. 5 is similar to FIG. 3 and need not be further detailed.

The reaction mass has been shown in block form. However, Applicant recognized that it is preferable to have a reaction mass which tends to be shaped like a "fat" pancake rather than an elongated cylinder. It should be noted that the power generated and/or available from a mass-on-spring WEC (MOSWEC) is a linear function of weight over a wide range of weigh. It is therefore desirable to have much weight (reaction mass) as possible. However it is also evident that the weight can not be greater than a value which would cause the WEC to sink and/or which would interfere with the proper response of the WEC. Applicant also recognized that the available power from a MOSWEC is a function of the length of the stroke L. However, the cost of manufacture increases exponentially as the stroke and the size of the WEC increases. Thus, there is a need to define an optimum design taking many of these different factors into consideration.

Figure 6:
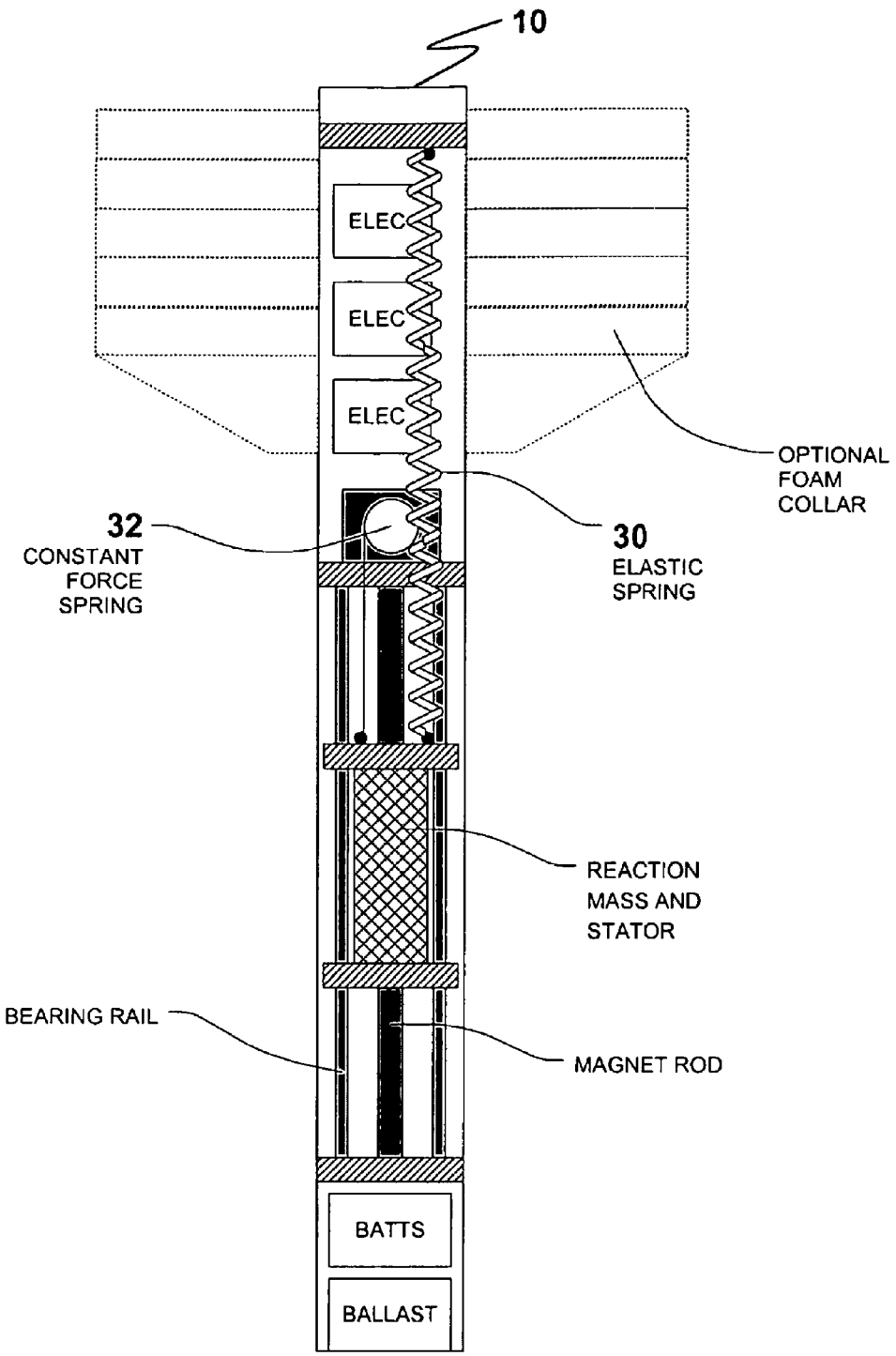
FIG. 6 is a simplified block diagram of a WEC in which a constant force spring and an elastic springs are used to control the positioning and movement of a reaction mass which includes part of the power take device.

FIG. 6 shows another embodiment of the invention in which the reaction mass is supported by both a constant force spring 32 and an elastic spring 30. The two types of springs are either attached directly to the buoy shell or indirectly to the shell via support brackets. The constant force spring is placed above the reaction mass and is designed/selected to have a counterbalancing force equal roughly to the weight (weight=mass×gravitational acceleration) of the reaction mass. If the force of the constant force spring's force is exactly equal to the weight of the reaction mass, the elastic spring 30 can be split into an upper half, connected to the shell 10 above the reaction mass, and a lower half, connected to the shell below the reaction mass (e.g., as shown in FIG. 5). If the force of the constant force spring is less than the reaction mass weight, then an elastic spring below the reaction mass is not required. In FIG. 6, the reaction mass contains the "Stator" portion of a linear electric generator (LEG) that houses the generator coils. The reaction mass slides up and down a magnet rod comprised of many magnets. Voltage(s) is/are induced in the Stator Coils as the reaction mass slides up and down the magnet rod. Electrical energy (power) is then transferred from the moving stator to the buoy electrical equipment (ELEC) via a flexible cable, sliding electrical contacts, or through the guide rails, which must then be electrically isolated from each other and the structure. Thus, in FIG. 6 parts of the power take-off device (PTO) are combined and included within a package or block which includes the reaction mass. Note that the shell may also include batteries and a ballast section.

What is claimed is:

1. A wave energy converter (WEC) system comprising:
a shell responsive to wave motion in a body of water;
an internal oscillator including a reaction mass and a spring mechanism contained within the shell; the spring mechanism including a constant force spring connected between the reaction mass and the shell and an elastic spring also connected between the reaction mass and the shell, said internal oscillator mounted within the shell for moving out of phase relative to the shell, when the shell and the internal oscillator are placed in a body of water subject to wave conditions; and
a power take-off (PTO) device, located within the shell, coupled between the shell and the internal oscillator for converting their relative motion into electrical energy.

2. A wave energy converter (WEC) system as claimed in claim 1 wherein the constant force spring is selected to exert a relatively constant force (Fc) which is a function of the mass (m) of the reaction mass multiplied by the gravitation constant (g).

3. A wave energy converter (WEC) system as claimed in claim 2 wherein the force, Fc, exerted by the constant force spring is selected to be less than (m)×(g) to keep the elastic spring under tension during an upstroke.

4. A wave energy converter (WEC) system as claimed in claim 2 wherein the constant force spring counterbalances the weight of the reaction mass to control the static extension length of the elastic spring and maintain the static extension length of the elastic spring at a predetermined value.

5. A wave energy converter (WEC) system as claimed in claim 2 wherein the reaction mass is suspended from the top of the shell by the two springs.

6. A wave energy converter (WEC) system as claimed in claim 1 wherein the constant force spring exerts a relatively constant force to counterbalance a selected amount of the weight of the reaction mass to control the extension length of the elastic spring under static conditions.

7. A wave energy converter (WEC) system as claimed in claim 6 wherein the elastic spring has a first end and a second end, wherein the first end is connected to the shell and wherein the elastic spring has a length Xn when no weight is attached to its second end; and wherein the elastic spring tends to have an extension length of Xo, for a total length of Xn+Xo, when a given reaction mass is attached to the second end of the elastic spring; and wherein the constant force spring is connected between the shell and the reaction mass to counterbalance the weight of the reaction mass and reduce the extension length of Xo.

8. A wave energy converter (WEC) system as claimed in claim 7 wherein the constant force spring is selected to reduce the extension length Xo to zero.

9. A wave energy converter (WEC) system as claimed in claim 7 wherein the reaction mass moves up and down about Xo+Xn in response to the waves.

10. A wave energy converter (WEC) system as claimed in claim 7, wherein the still water extension of the elastic spring would tend to be equal to Xo, where $x_0=(T_n/2\pi)^2 \cdot g$; and T is the period of a predominant wavelength of an ocean wave and g is the gravitational constant; and wherein the constant force spring is connected in parallel with the elastic spring to make Xo a preselected constant value.

11. A wave energy converter (WEC) system comprising:
a float responsive to wave motion in a body of water;
an internal oscillator including a reaction mass and a spring system contained within the float;
the spring system including a constant force spring and an elastic spring;

means connecting the constant force spring between the float and the reaction mass for exerting a relatively constant force (Fc) counterbalancing the weight of the reaction mass; and means connecting the elastic spring between the shell and the reaction mass for exerting a force ($F_{es}$) on the reaction mass that is proportional to the displacement, x, of the elastic spring.

12. A wave energy converter (WEC) system as claimed in claim 11 further including a power take-off (PTO) device, located within the shell, coupled between the shell and the internal oscillator for converting their relative motion into electrical energy.

13. A WEC as claimed in claim 11, wherein the reaction mass and spring oscillator system is tuned to the wavelength of the predominant waves of the body of water resulting in the still-water extension spring length ($x_0$) of an elastic spring tending to be $x_0=(T_n/2\pi)^2 \cdot g$; where T is the period of the predominant waves and g is the gravitational constant; and wherein the constant force spring is selected to reduce Xo.

* * * * *